United States Patent

Venables, III

[15] 3,681,849
[45] Aug. 8, 1972

[54] SQUARENESS GAUGE

[72] Inventor: Herbert J. Venables, III, Cleveland, Ohio

[73] Assignee: The Venables Machine and Tool Company, Cleveland, Ohio

[22] Filed: Dec. 12, 1969

[21] Appl. No.: 884,512

[52] U.S. Cl. ................................................33/385
[51] Int. Cl. ..............................................G01c 9/28
[58] Field of Search.....................33/207 R, 213, 214

[56] References Cited

UNITED STATES PATENTS

| | | | |
|---|---|---|---|
| 2,906,032 | 9/1959 | Holderer | 33/214 |
| 3,159,926 | 12/1964 | Holderer | 33/214 |
| 2,635,350 | 4/1953 | Bettega | 33/211 X |
| 2,567,553 | 9/1951 | Davey | 33/214 |
| 1,422,231 | 7/1922 | Stanley | 33/207 |
| 657,443 | 9/1900 | Newton | 33/213 X |
| 3,071,863 | 1/1963 | MacMillan | 33/214 X |

FOREIGN PATENTS OR APPLICATIONS

252,378   1948   Switzerland................33/214

*Primary Examiner*—Leonard Forman
*Assistant Examiner*—Dennis A. Dearing
*Attorney*—McNenny, Farrington, Pearne and Gordon

[57] ABSTRACT

A gauge, for measuring the parallelism or perpendicularity of precision machined surfaces, comprising a rectangular base having a pair of vertical surfaces and an adjoining horizontal surface, a graduated spirit level pivotably mounted on the base, and an adjustment member for adjusting the levelness of the spirit level relative to the base to calibrate the gauge to one of the surfaces to be measured and permit direct relative measurement of another surface including an opposed vertical surface. Also provided is a means permitting the gauge to be self aligned to a vertical surface while it is supported by an adjacent horizontal surface.

1 Claim, 3 Drawing Figures

PATENTED AUG 8 1972
3,681,849
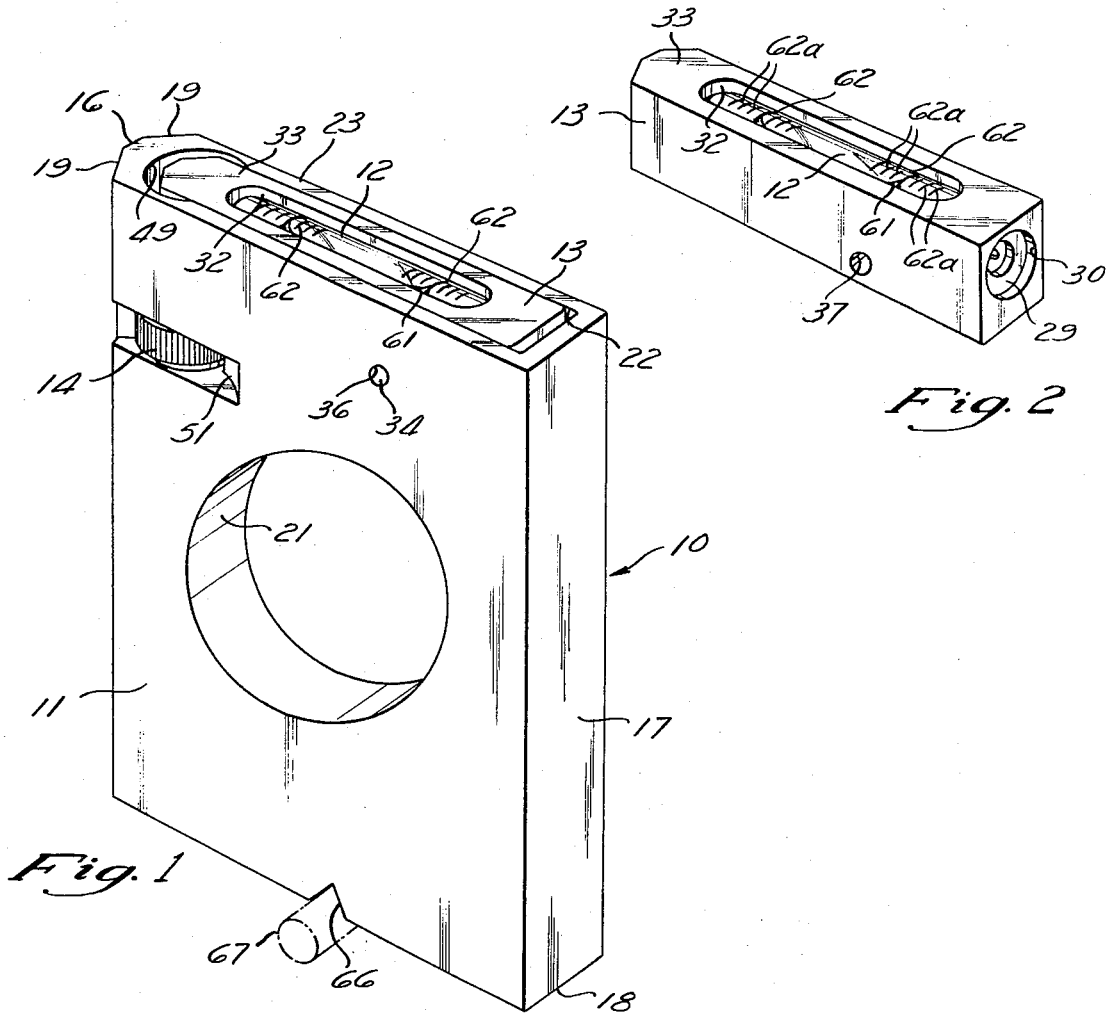
Fig. 1
Fig. 2
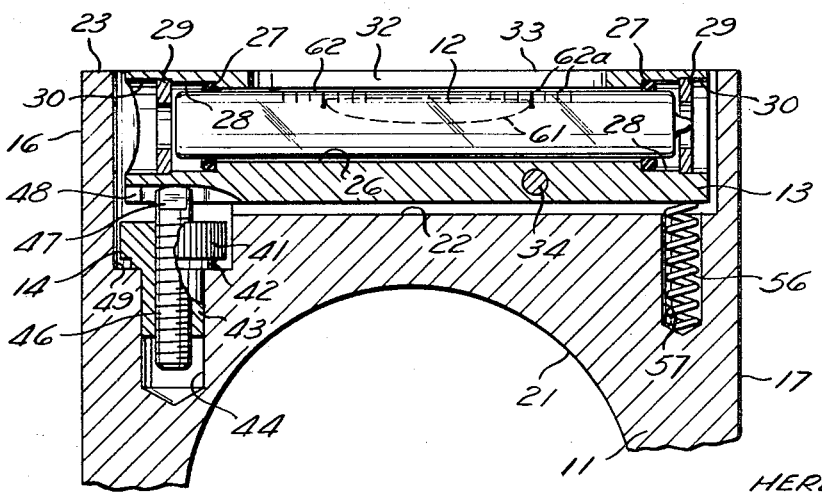
Fig. 3
INVENTOR.
HERBERT J. VENABLES, III
BY
McNENNY, FARRINGTON, PEARNE & GORDON
ATTORNEYS

SQUARENESS GAUGE

BACKGROUND OF THE INVENTION

This invention relates to a precision squareness gauge for measuring the parallelism or perpendicularity of machined surfaces.

In precision machine work it is often necessary to check the squareness of adjacent machined surfaces. Various spirit levels and holder arrangements have been commercially available. Generally these devices have not been well suited for quick and accurate relative angular measurement of all of the important surfaces of an object or workpiece.

When machining or measuring an object, in most instances, it is not necessary that the object or a reference face of the object be perfectly horizontal or vertical. A machine tool or surface table supporting the object likewise need not be exactly level. It is important only to measure certain surfaces of the machined object relative to each other and these measurements may be made without regard to the absolute levelness of the object.

A conventional and perhaps the most familiar type of level provides a spirit level rigidly fixed and aligned to a base member. It is not convenient to use this fixed type of level for checking the squareness of one surface relative to another since it is adapted only to measure absolute levelness. To determine relative squareness, absolute measurements of individual surfaces must be added or subtracted. This procedure is particularly confusing and productive of errors when the surfaces to be compared include oppositely facing vertical surfaces and only one vertical base surface is provided on the level. In such a case, measurements may not be simply added or subtracted as they are when comparing vertical surfaces facing in the same direction. A similar problem is discussed further in the description below.

Adjustable type levels providing a spirit level pivotably fixed to a base member have also been available. Like the rigid level type mentioned above, levels of this type, generally, do not provide cooperating vertical base surfaces to facilitate measurement of opposed vertical faces.

SUMMARY OF THE INVENTION

The invention provides a gauge which is particularly adapted to measure directly the relative squareness of all the important surfaces of a workpiece. The gauge includes a pair of opposed vertical sides and a horizontal lower side precisely machined for parallelism and perpendicularity. An adjustable spirit level is provided on the body or base of the gauge, and an adjustment member allows the spirit level to be accurately leveled independently of the attitude of the gauge body.

A relative measurement between two object surfaces may be conveniently made by first zeroing in or calibrating the spirit level to one of the surfaces. The angular alignment of the other surface relative to the first surface may be read directly on the spirit level by simply holding a proper side of the gauge against the second surface. Relative squareness between two surfaces may thus be measured directly without first recording and then comparing readings of absolute levelness.

In addition to providing a means to calibrate the gauge to one surface and to indicate the relative squareness of a second surface directly, the invention provides an arrangement which facilitates measurement of oppositely facing vertical faces. Further, a novel means is provided to permit the gauge to be self aligning to a vertical surface while it is supported and aligned by an adjacent horizontal surface.

BRIEF DESCRIPTION OF THE DRAWING

FIG. 1 is a perspective view of a squareness gauge constructed in accordance with the principles of this invention.

FIG. 2 illustrates a spirit level and its holder, shown partially concealed in FIG. 1, removed from the gauge body.

FIG. 3 is an elevational cross-sectional view of the upper portion of the squareness gauge.

DESCRIPTION OF THE PREFERRED EMBODIMENT

Referring to the Figures, a squareness gauge 10, is shown in its preferred form. The gauge 10 includes, as its principle parts, a rectangular body or base 11, a spirit level 12, a spirit level holder 13 and an adjustment nut 14. The spirit level 12 may be adjusted relative to the base 11 by rotating the adjusting nut 14.

The base member 11 is in the form of a rectangular block having a pair of flat vertical surfaces 16 and 17 and a lower flat horizontal surface 18. These vertical and horizontal surfaces 16 through 18 are precision ground to reference quality and are square to one another within an angular tolerance small in comparison to the sensitivity of the spirit level 12 which, as mentioned below, may be in the order of 5 seconds. A pair of beveled edges 19 are formed on the left side of the body 11, as viewed in the Figures, adjoining the vertical surface 16. These beveled edges 19 permit the vertical surface 16 to be abutted against an object in close quarters or at a filleted corner of an object. A circular hole 21 is provided through the center portion of the body 11 to facilitate handling and positioning of the gauge 10.

The spirit level holder 13 is positioned in an elongated recess 22 milled in an upper side 23 of the base member 11. The spirit level holder 13 comprises an elongated rectangular block having a longitudinal bore 26 in which the spirit level 12 is positioned. The bore 26 is slightly larger in diameter than the diameter of the spirit level 12. A pair of O-rings 27 of rubber or the like are set into a pair of associated counterbores 28 formed in each end of the holder 13 and support the spirit level 12 in the holder 13. A pair of retaining washers 29 are pressed into second counterbores 30 at the extreme ends of the holder 13 to retain the spirit level 12 in the longitudinal bore 26. An elongated slot or aperture 32, milled in an upper side 33 of the holder 13, communicates with the longitudinal bore 26 to expose the scale portion of the level 12.

The spirit level holder 13 is pivotably fixed in the base member 11 by a pin 34. The pin 34 is pressed into a transverse hole 37 drilled through the holder 13. The pin 34 rotates in a pair of aligned holes 36 (only one is shown) in the base member 11. The spirit level holder 13 may be adjustably rotated about the center of the pin 34 by rotating the adjustment nut 14. The adjustment nut 14 comprises a knurled head section 41, a shoulder 42, and a cylindrical extension 43. The cylindrical extension 43 rotates in a hole 44 drilled in the upper portion of the base member 11.

The adjusting nut 14 is threaded internally along its length to support a threaded pin or screw 46. A pair of flats 47 are formed on the upper end of the threaded pin 46. The upper end of the pin 46 is disposed in a short longitudinal slot 48 cut in the under side of the spirit level holder 13. The flats 47 engage the sides of the slot 48 to prevent rotation of the pin 46. During assembly the adjusting nut 14 is lowered into the holder through a counterbore 49 in the upper surface 23 of the base. A horizontal slot 51 is cut into each side of the base member 11 to provide finger access to the knurled head 41 of the adjusting nut. The knurled head 41, thus, lies just below the side surfaces of the base member to prevent accidental movement of the adjusting nut while the gauge 10 is being handled.

A compression spring 56 is positioned in a vertical hole 57 at the bottom of the elongated holder recess 22. The spring 56 is precompressed in the hole 57 sufficiently to keep the spirit level holder 13 in contact with the upper end of the adjustment screw 46 as the holder 13 pivots on the center of the pin 34.

It may be seen that the bias force of the spring 56, transmitted through the holder 13 and screw 46, holds the shoulder 42 of the adjustment nut 14 against the bottom of the counterbore 49. Rotation of the adjustment nut 14 in one direction causes the screw 46 to rise and rotation in the opposite direction causes the screw 46 to retract to thereby adjust the levelness of the spirit level 12 relative to the base 11.

The spirit level 12 is conventional in construction and comprises a sealed cylindrical glass vial containing a liquid and an indicating bubble 61. The upper interior surface of the vial is ground in a longitudinal arc which, when the spirit level is properly mounted, lies in the vertical plane of the gauge base 11. In operation, the bubble 61 seeks the uppermost or highest point of this arcuate surface. The location of this uppermost point depends, of course, on the attitude of the spirit level. Bubble movement and, therefore, gauge sensitivity is proportional to the radius of the arc.

The upper exterior surface of the spirit level is graduated with a series of etched lines or reference scale divisions 62a. Ideally, the sensitivity of the spirit level is chosen to suit the nature of the work being measured. A scale 62 having six reference divisions, or seven pairs of reference lines, each representing 5 seconds of angular displacement has been advantageously used in one arrangement. A full scale deflection of the bubble, in this case, represented 30 seconds of angular displacement.

To measure relative squareness, that is, parallelism or perpendicularity of two surfaces, the gauge 10 is first adjusted or calibrated to one of the surfaces. Most commonly, during surface measurement a workpiece will be supported on its underside or base surface by a larger horizontal flat surface such as a surface table. To use the base surface of the workpiece as its reference surface the gauge is positioned upright on the surface table adjacent the workpiece and the adjusting nut 14 is manually turned until the spirit level 12 is in a desired position of levelness. Generally, this position will be at the point where the bubble 61 is centered in the reference scale 62. If the surface table is sufficiently flat, the gauge will be calibrated to a plane common to both the surface table and the base surface of the workpiece.

Next, the gauge 10 is abutted against another surface of the workpiece to be measured for squareness relative to the first or base surface of the workpiece. One of the vertical surfaces 16 or 17 is used if the second object surface is generally vertical, or the horizontal surface 18 is used if the second object surface is generally horizontal. The gauge 10 will indicate directly, by means of the bubble 61 and reference scale 62, the relative squareness between the first and the second surfaces. If the first or base surface and the second surface are exactly parallel or perpendicular the spirit level 12 will indicate, at the second surface, the same reading as set or calibrated for the first surface. If the second surface is not parallel or perpendicular the spirit level will indicate the angular misalignment by a change in bubble reading from the set reading. The actual angle of misalignment is measured by the number or fraction of reference divisions 62a through which the bubble moves.

While, as indicated, the squareness gauge 10 may be used for checking the surfaces of a finished object lying on a surface table, the gauge may also be advantageously used to measure the surfaces of a workpiece while it is being machined and is still mounted on a machine. Further, it is not necessary to calibrate the gauge to the base surface of the object only. The gauge may be calibrated to any other horizontal or vertical object surface by abutting a corresponding surface, either the lower horizontal surface 18 or one of the vertical surfaces 16 or 17, of the gauge against it and adjusting the level 12 in the same manner as described above.

Once the gauge 10 has been calibrated to a first surface it must not be rotated about a vertical axis to measure another surface. Assuming the first surface is not perfectly level, the gauge is calibrated with the base 11 inclined slightly about a horizontal axis either clockwise or counter-clockwise. This inclination or attitude of the first surface and the base 11 becomes a reference attitude. If the gauge is then rotated about a vertical axis the reference is lost. For instance, if the gauge is turned 180° about a vertical axis to measure an oppositely facing vertical surface the spirit level will erroneously indicate squareness with the same bubble reading only when the second surface is misaligned or inclined in the opposite direction, counterclockwise or clockwise respectively. The arrangement of the present invention avoids the necessity of turning the gauge 180° by providing the oppositely facing vertical base surfaces 16 and 17. The vertical base surfaces 16 and 17 cooperate in these circumstances so that during a relative measurement either one may be abutted against the first vertical surface and the other against the second vertical surface.

The lower base surface 18 is provided with a transverse notch or recess 66 for alignment purposes. It is sometimes difficult to abut a rectangular gauge against a vertical surface when the gauge is supported by an adjacent horizontal surface. If the vertical and horizontal surfaces are not exactly square, the gauge must rest on one of its lower corners. It may be difficult to feel which surface the gauge is abutting when the adjacent surfaces are nearly square or perpendicular. The gauge of this invention may be made self aligning to eliminate these difficulties by positioning a dowel pin 67, shown in phantom, of suitable diameter in the notch 66 to hold the lower surface 18 above the horizontal object surface. The gauge pivots on the dowel pin 67 and aligns itself against the vertical surface being measured.

The notch 66 is machined across the full width of the lower base surface 18 and is perpendicular to the plane of the gauge 10. When the gauge 10 and dowel pin 67 are properly seated on a horizontal surface, the gauge may only pivot in a vertical plane. Experience has shown that the use of the dowel pin 67 with this notch 66 produces more reliable measurements than are normally possible without such use. The risk of measurement error due to unintentional cocking of the gauge out of a vertical plane is eliminated.

The foregoing description is necessarily of a detailed character so that the invention may be completely set forth but it will be understood that various modifications may be made without departing from the scope of the invention.

What is claimed is:

1. A squareness gauge comprising a precision ground rectangular body having a flat lower base surface and a pair of oppositely facing flat side base surfaces adjoining and substantially perpendicular to said lower surface, said body having an upper side defining the upper extent of the body, precision spirit level means including a spirit level, a spirit level holder, pivot means permitting angular displacement of the holder and level relative to the body only in a plane perpendicular to said base surfaces, screw adjustment means for precise angular positioning of said holder and level relative to said body, said screw adjustment means including an adjustment nut entirely within said base member whereby accidental movement of the nut is prevented while said gauge is being handled, and a spring on said body biasing said holder against said screw adjustment means, said level including a movable bubble therein, a plurality of reference divisions being arranged along a path taken by said bubble as the level is rotated with said body in said perpendicular plane, said reference divisions each directly indicating with said bubble a predetermined minute angular displacement of the level in the order of five seconds, said base surfaces being precision formed and square to one another within an angular tolerance small in comparison to an angle represented by one of said reference divisions, an alignment notch extending transversely across the full width of the lower base surface and normal to said perpendicular plane, a cylindrical dowel pin adapted to be positioned in said alignment notch whereby said gauge is self aligning to a vertical surface as it is supported with said dowel pin on an adjacent horizontal surface, a hole in the mid-portion of said body to facilitate handling of the gauge, said spirit level means being disposed adjacent the upper side of the body to permit said screw adjustment nut to be manually engaged in a zone vertically defined by the upper portion of said body and to permit said level to be viewed from a direction directly above said body.

* * * * *